(12) United States Patent
Marin et al.

(10) Patent No.: US 6,883,721 B2
(45) Date of Patent: Apr. 26, 2005

(54) METHOD AND SYSTEM FOR LANCING GAS INTO AN ENVIRONMENT WITH VARIABLE ENTRAINMENT OF NON-LANCED GAS

(75) Inventors: Ovidiu Marin, Lisle, IL (US);
Mahendra L. Joshi, Darien, IL (US);
Olivier Charon, Chicago, IL (US);
Harley A. Borders, Highlands Reanch, CO (US)

(73) Assignee: American Air Liquide, Inc., Fremont, CA (US)

( * ) Notice: Subject to any disclaimer, the term of this patent is extended or adjusted under 35 U.S.C. 154(b) by 99 days.

(21) Appl. No.: 10/323,541

(22) Filed: Dec. 19, 2002

(65) Prior Publication Data

US 2003/0230644 A1 Dec. 18, 2003

Related U.S. Application Data

(62) Division of application No. 09/523,050, filed on Mar. 10, 2000, now abandoned.

(51) Int. Cl.$^7$ ................................................ B05B 1/28
(52) U.S. Cl. ............................ 239/8; 239/290; 239/398
(58) Field of Search ............................ 239/8, 290, 398, 239/418, 419, 419.3, 421, 422, 423, 424, 427, 427.3, 428

(56) References Cited

U.S. PATENT DOCUMENTS

| 1,279,315 A | * | 9/1918 | Foerst ..................... 239/419.3 |
| 3,470,061 A | | 9/1969 | Barker |
| 3,860,479 A | | 1/1975 | Barker et al. |
| 4,024,229 A | | 5/1977 | Smith et al. |
| 4,855,123 A | | 8/1989 | Suzuki et al. |
| 5,082,526 A | | 1/1992 | Dorris |
| 5,624,545 A | | 4/1997 | Landfors et al. |
| 5,873,524 A | * | 2/1999 | Bodelin et al. ................. 239/8 |

FOREIGN PATENT DOCUMENTS

WO     WO97/42372     4/1997

* cited by examiner

*Primary Examiner*—David A. Scherbel
*Assistant Examiner*—Thach H. Bui
(74) *Attorney, Agent, or Firm*—Christopher J. Cronin; Linda K. Russell

(57) ABSTRACT

A system and method are disclosed for lancing gas into an environment, such as a furnace, wherein an inner conduit is in communication with a gas supply and adapted to transport a gas at a first mass flow rate, and an outer conduit is in communication with a gas supply and adapted to transport a gas at a second mass flow rate. The first mass flow rate is greater than the second mass flow rate, preferably at least two times greater. The distal end of the inner conduit is preferably recessed back at a distance from the distal end of the outer conduit.

32 Claims, 7 Drawing Sheets

US 6,883,721 B2

METHOD AND SYSTEM FOR LANCING GAS INTO AN ENVIRONMENT WITH VARIABLE ENTRAINMENT OF NON-LANCED GAS

This application is a divisional of application Ser. No. 09/523,050 filed Mar. 10, 2000 now abandoned.

BACKGROUND OF THE INVENTION

This invention relates, in general, to lancing design in industrial applications, and more particularly, to improving the combustion-enhancing characteristics of gases lanced into combustion environments.

Lancing is a process used to improve combustion in industrial applications. Typically, lancing involves injecting gas into a primary flame or fuel stream so as to maintain flame stability and aid the fuel ignition process. This is especially true for applications such as rotary kilns, where low quality fuels are often used and dust is present in large quantities in the flame neighborhood. Oxygen is commonly used as a lancing gas in these applications.

Ideally, the exposure of the lanced gas to the primary flame or fuel stream is at a maximum. In order to obtain maximum exposure, the lanced gas must penetrate far into the fuel environment and sweep over the fuel jet over a wide area. Thus, high velocity lances are traditionally employed, which have the disadvantage of often entraining a large volume of the surrounding medium. In many combustion applications, the entrainment of flue gases, nitrogen, particulates, and dust can reduce the lanced gas concentration. Thus, it is more difficult to maintain uniform flame temperature profiles and ideal combustion conditions.

Furthermore, high velocity lances can require high supply pressures and high operating costs. In addition, high velocity lances can create high particulate and $NO_x$ emissions, and can increase safety risks, as the high velocities at the lance exit increase the chances of premature ignition.

Accordingly, there is a need for a lancing process that transports the lanced gas a greater distance and sweeps over the fuel jet over a wide area, while having greater injected gas concentration. Moreover, there is a need for a cost-effective lancing process that does not require high velocities or high supply pressures and that does not pose environmental or safety risks.

SUMMARY OF THE INVENTION

The present invention provides a method and system for lancing a gas into an environment which allows variable amounts of non-lanced gas to be entrained in the lanced gas depending on the ratio of mass flow rates and the ratio of velocities of the lanced gas and the non-lanced gas. In particular, systems are provided which comprise of an inner conduit and an outer conduit, said inner conduit being in communication with a gas supply and adapted to transport a gas at a first mass flow rate, said outer conduit being in communication with a gas supply and adapted to transport a gas at a second mass flow rate, the first mass flow rate being greater than the second mass flow rate.

In another aspect of the invention, a method is provided for injecting a gas at a first mass flow rate through the inner conduit, and injecting a gas at a second mass flow rate through the outer conduit, the first mass flow rate being greater than the second mass flow rate.

In yet another aspect of the invention, the distal end of the inner conduit is recessed a distance from the distal end of the outer conduit.

It is noted that, unless otherwise noted, the pressures given in Pa are intended to refer to gauge pressures.

These and other features of the invention will become apparent upon review of the following detailed description of the presently preferred embodiments of the invention, taken into conjunction with the appended figures.

DETAILED DESCRIPTION OF THE PREFERRED EMBODIMENTS

Figure 1:
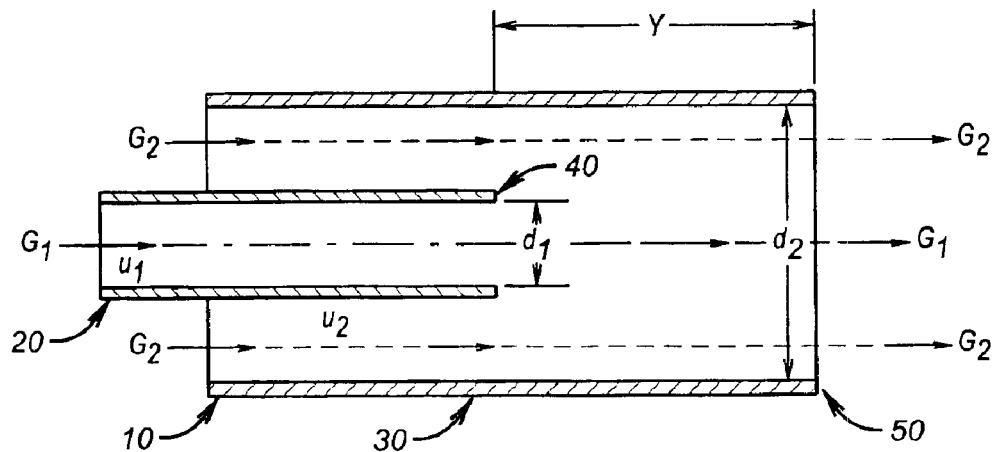
FIG. 1 is a cross-sectional schematic diagram of a lancing system according to a preferred embodiment of the present invention.

Illustrated in FIG. 1, is a preferred system for lancing gas 10 in accordance with the present invention. This preferred system includes an inner conduit 20 and an outer conduit 30. Inner conduit 20 and outer conduit 30 are concentric to each other and are in communication with the same or different gas supplies. Inner conduit 20 has a distal end 40 and outer conduit has a distal end 50. In addition, inner conduit 20 has an inner diameter $d_1$ and outer conduit 30 has an inner diameter $d_2$. Diameter $d_1$ preferably ranges from about 1 cm to about 16 cm, and most preferably from about 2 cm to about 10 cm. Diameter $d_2$ preferably ranges from about 2 cm to about 31 cm, and is most preferably from about 5 cm to about 21 cm.

Distal end 40 is recessed a distance Y from Distal end 50. This distance Y preferably ranges from about 0.5 to about 6 times diameter $d_2$, or from about 1 cm to about 186 cm, and most preferably from about 1 to about 4 times diameter $d_2$, or from about 5 cm to about 84 cm.

Inner conduit 20 is adapted to transport a first gas $G_1$ at a first velocity $u_1$. Outer conduit 30 is adapted to transport a second gas $G_2$ at a second velocity $u_2$. First velocity $u_1$ is greater than second velocity $u_2$ to thereby create a shielded transition zone that ensures that first gas $G_1$ has a lower degree of entrainment of dust, particulates, and undesirable gases from the environment while it penetrates deeper into the flame neighborhood. Similarly, the mass flow rate, which is the amount of mass transported over time, of first gas $G_1$ is greater than the mass flow rate of second gas $G_2$ to create the above-described shielded transition zone. Preferably, the mass flow rate of first gas $G_1$ is at least two to three times greater than the mass flow rate of second gas $G_2$ to minimize the above-described entrainment. The interaction between first gas $G_1$ and second gas $G_2$ after they exit inner conduit 20 and outer conduit 30, respectively, provides a wide lancing jet that preferably interacts more intensely with its target, either the fuel jet or the flame.

The mass flow rate of first gas $G_1$ preferably ranges from about 0.1 ton per day ("t/d") to about 200 t/d, and most preferably from about 1 t/d to about 100 t/d. The mass flow rate of second gas $G_2$ preferably ranges from about 0 t/d to about 100 t/d, and most preferably from about 0 t/d to about 50 t/d.

The supply pressure of first gas $G_1$ preferably ranges from about 500 Pa to about 700,000 Pa, and most preferably from about 650 Pa to about 450,000 Pa. The supply pressure of second gas $G_2$ preferably ranges from about 70 Pa to about 150,000 Pa, and most preferably from about 150 Pa to about 75,000 Pa.

First gas $G_1$ and second gas $G_2$ can be of the same or different chemical composition. In rotary kiln applications, first gas $G_1$ is preferably oxygen-enriched air or, more preferably, oxygen derived from a Pressure Swing Adsorption (PSA), Volume Swing Adsorption (VSA) or Temperature Swing Adsorption (TSA) process, all of which are commonly known in the art. First gas $G_1$ will be lanced deep into the kiln. Second gas $G_2$ is preferably low-pressure oxygen which is more preferably derived from a PSA, VSA or TSA process. This design reduces the amount of lanced oxygen needed to maintain the combustion reaction in the kiln, and reduces the pressure necessary to supply the oxygen. Other possibilities for the second gas $G_2$, from more preferable to less preferable, include: air, nitrogen, argon, carbon dioxide, flue gas, and steam. It will be appreciated by those skilled in the art that the oxygen-enriched air, or oxygen, may be provided from vaporizing liquid oxygen from a cryogenic Air Separation Unit (ASU), which is commonly known in the art, and the like. The use of substantially pure (about 90%) oxygen from a PSA, VSA or TSA process is preferred.

When first gas $G_1$ is oxygen and second gas $G_2$ is nitrogen or argon, first gas $G_1$ and second gas $G_2$ can be supplied by the same or different gas sources. For example, a cryogenic ASU can supply oxygen and either nitrogen or argon. Alternatively, vaporized liquid oxygen can supply the oxygen while vaporized liquid nitrogen supplies the nitrogen or vaporized argon supplies the argon. In another embodiment, a PSA, VSA, or TSA process can supply oxygen while a cryogenic ASU supplies the nitrogen. However, because a cryogenic ASU typically supplies gases at higher pressures than a PSA, VSA or TSA process, it may be preferable to have a cryogenic ASU supply the oxygen while a PSA, VSA or TSA process supplies the nitrogen.

Figure 2:
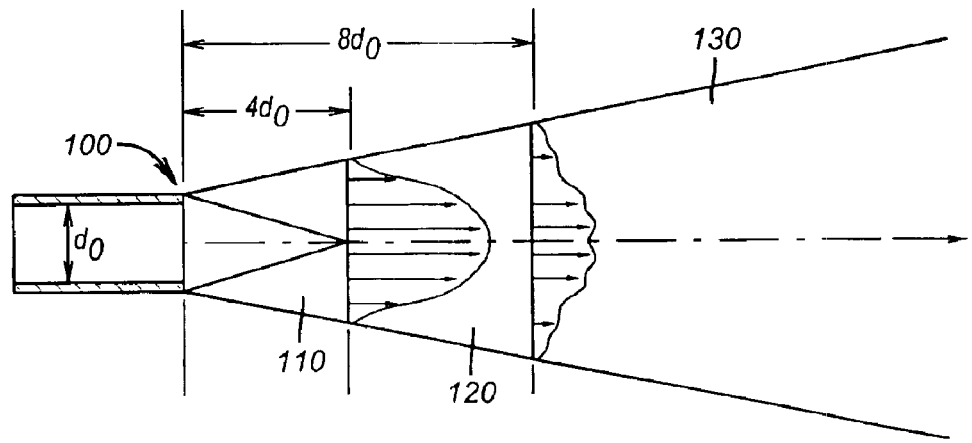
FIG. 2 is a schematic diagram of the core, transition, and similarity zones that a lanced gas typically encounters after exiting the lance tip in a known standard lance, according to turbulent jet theory.
Figure 3:
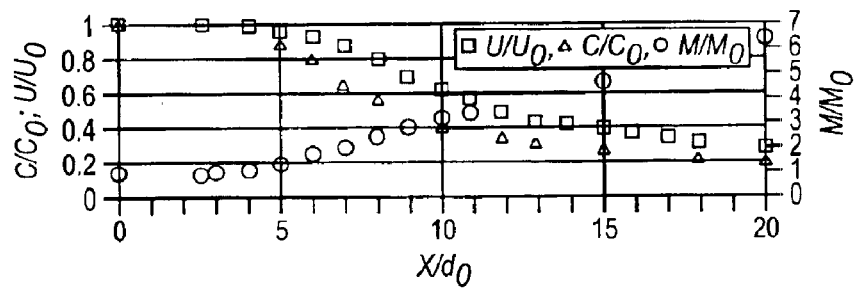
FIG. 3 is a plot of the distribution of mass, axial velocity, and concentration of lanced gas as a function of normalized distance from the lance tip in a known standard lance, according to turbulent jet theory.

The fundamental characteristics of a turbulent jet, which are well-known in the art, are described by G. N. Abramovich in his *Theory of Turbulent Jets* (1963), and are shown in FIGS. 2 and 3. FIG. 2 shows that immediately downstream of the jet nozzle 100 is a core zone 110, where the mass, velocity, and concentration of the lanced gas remain unchanged. This core zone extends to a length of about 4 times the diameter $d_o$ of the jet nozzle 100. Downstream of the core zone 110 is a transition zone 120, where mass, velocity, and concentration of the lanced gas are transferred perpendicular to the direction of flow. This transition zone 120 extends to a length of about 8 times the diameter $d_o$ of the jet nozzle 100. Downstream of the transition zone 120 is a similarity zone 130, where the velocity profiles in all cross-sections perpendicular to the main flow direction can be described by the same function, as can the distributions of concentration and temperature.

FIG. 3 illustrates the performance of a standard lance. FIG. 3 illustrates that the mass M of the lanced gas increases by about 5 times at $X/d_o$ is equal to 15, where X is the penetration distance of the lanced gas. This increase in mass M in the axial direction in a standard lance is due to the entrainment of impurities from the surrounding gas, which in this case is air or a combination of air and combustion products. In addition, the velocity U of the lanced gas decreases by about 60% and the concentration C of the lanced gas decreases by about 70% at the same distance. $M_o$, $U_o$, and $C_o$ are the initial mass, velocity, and concentration of the lanced gas, respectively. Thus, in order to make known, standard lancing processes more effective in industrial applications, penetration distance X has to be increased while minimizing the entrainment of impurities in the lanced gas.

In order to further demonstrate the advantages of the proposed device over conventional lances, the following example has been simulated by Computational Fluid Dynamic (CFD) simulation, which is commonly known in the art. A given amount of oxygen is injected into a combustion environment with both a traditional lance and a system according to the present invention. In order to evaluate the interactions between the lanced gas and the environment, the oxygen is lanced into a medium consisting of nitrogen. The simulation is performed with FLUENT UNS software, which is commonly used in the art and which is available from Fluent, Inc.

For the present invention, the simulated case includes an inner conduit, with an inside diameter of 0.056 meter and an outside diameter of 0.060 meter, positioned concentrically within an outer conduit having an inside diameter of 0.092 meter. Three cases have been evaluated:

1. In a traditional, or single jet, lance, only oxygen is lanced through the inner conduit at a velocity of 277 meters/second ("m/s"). This case is represented as "100/0" in FIGS. 4–9.
2. Oxygen is lanced through the inner conduit at a velocity of 200 m/s and through the outer conduit at a velocity of 50 m/s. The inner conduit carries 75% of the oxygen mass flow, and the outer conduit carries the remaining 25% of the oxygen mass flow. This case is represented as "75/25" in FIGS. 4–8, 10.
3. Oxygen is lanced through the inner conduit at a velocity of 140 m/s and through the outer conduit at a velocity of 89 m/s. The inner conduit carries 50% of the oxygen mass flow, and the outer conduit carries the other 50% of the oxygen mass flow. This case is represented as "50/50" in FIGS. 4–8, 11.

One would expected that, given the larger velocities of oxygen in the 100/0 case, the penetration distance of oxygen in the 100/0 case would be the largest. However, the results below show that, using the present invention, the penetration distance of oxygen in the 75/25 and 50/50 cases can surpass that of the 100/0 case.

Figure 4:
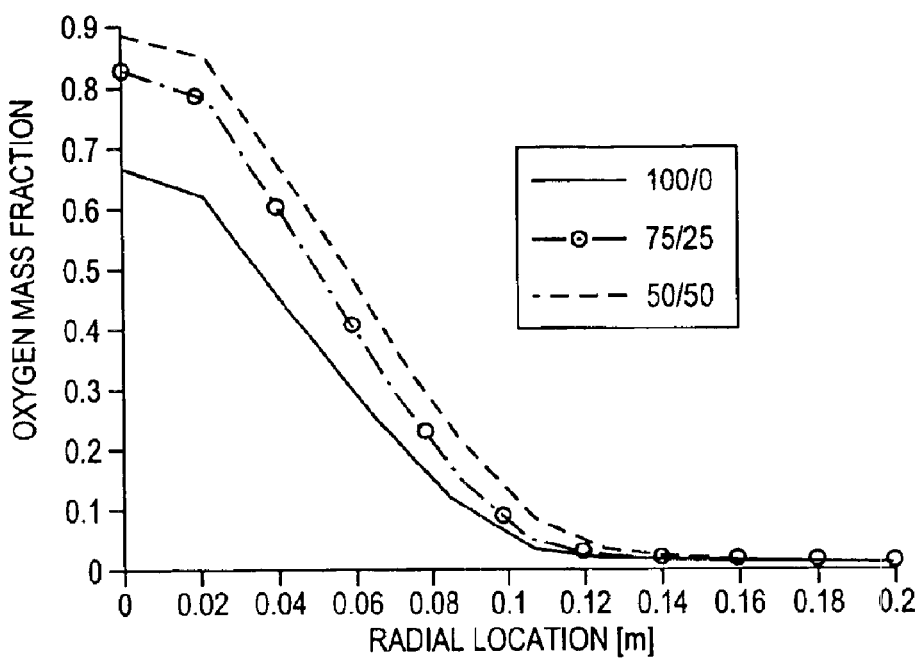
FIG. 4 is a plot of oxygen mass fraction as a function of radial location, at a penetration distance of 0.3 meters from the lance tip of a preferred lancing system of the invention.

FIGS. 4–8 present the oxygen mass fraction variation into the lanced environment, in a radial direction, at different axial locations into the medium. FIG. 4 presents the radial variation of the oxygen mass fraction at a penetration distance of 0.3 meters from the lance exit. The 50/50 case of the invention leads to the widest oxygen jet, while the 100/0 case (comparative example) leads to the narrowest jet, resulting in undesirable entrainment. This suggests that the traditional lancing method of a single jet is lacking in applications where a clean, relatively pure jet is needed. The 75/25 case of the invention is situated between the two other cases, showing an improvement with respect to the single jet lance. In fact, the 75/25 case presents an oxygen concentration at a radial location of 0.0 meters that is 26% higher than that of the 100/0 case. Moreover, the 50/50 case has an oxygen concentration at a radial location of 0.0 meters that is 34% higher than that of the 100/0 case. In addition, the jet width is significantly higher for the two jet cases.

Figure 5:
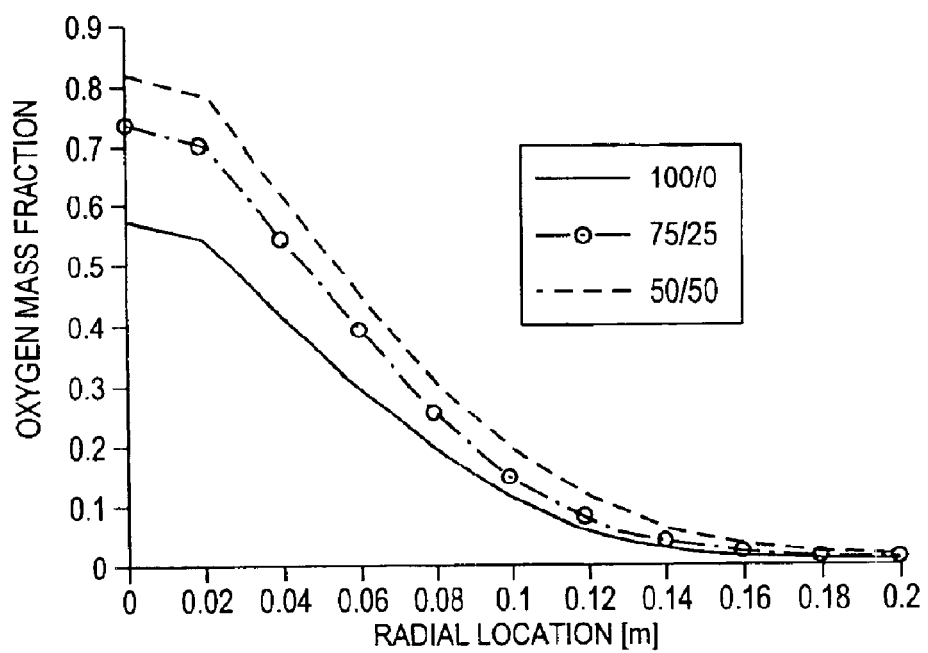
FIG. 5 is a plot of oxygen mass fraction as a function of radial location, at a penetration distance of 0.5 meters from the lance tip of a preferred lancing system of the invention.

Similar trends are evident in FIGS. 5–8. FIG. 5 illustrates the radial oxygen distribution at a penetration distance of 0.5 meters from the lance exit. Here, the 75/25 case presents an oxygen concentration at a radial location of 0.0 meters that is 28% higher than that of the 100/0 case. Meanwhile, the 50/50 case has an oxygen concentration at a radial location of 0.0 meters that is 41% higher than that of the 100/0 case. Again, the jet width is significantly higher for the two jet cases.

Figure 6:
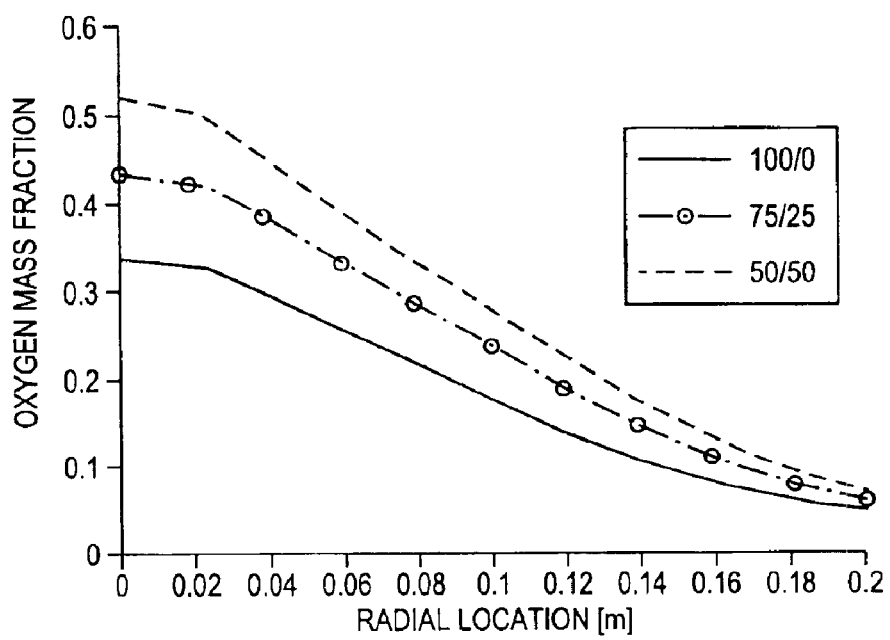
FIG. 6 is a plot of oxygen mass fraction as a function of radial location, at a penetration distance of 1.0 meters from the lance tip of a preferred lancing system of the invention.

FIG. 6 shows the radial oxygen distribution at a penetration distance of 1.0 meter from the lance exit. The 75/25 case presents an oxygen concentration at a radial location of 0.0 meters that is 26% higher than that of the 100/0 case. The 50/50 case has an oxygen concentration at a radial location of 0.0 meters that is 53% higher than that of the 100/0 case. And again, the jet width is significantly higher for the two jet cases.

Figure 7:
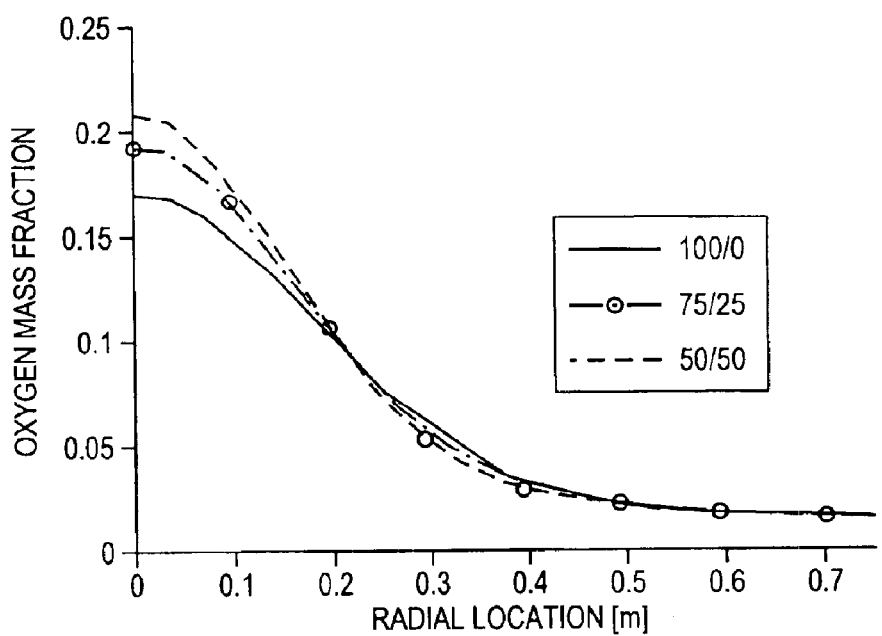
FIG. 7 is a plot of oxygen mass fraction as a function of radial location, at a penetration distance of 2.0 meters from the lance tip of a preferred lancing system of the invention.

FIG. 7 shows the radial oxygen distribution at a penetration distance of 2.0 meters from the lance exit. While the 75/25 case and the 50/50 case provide a higher oxygen concentration than the 100/0 case at a radial location of 0.0 meters, the oxygen concentrations for all three cases are almost identical starting at a radial location of about 0.18 meters.

Figure 8:
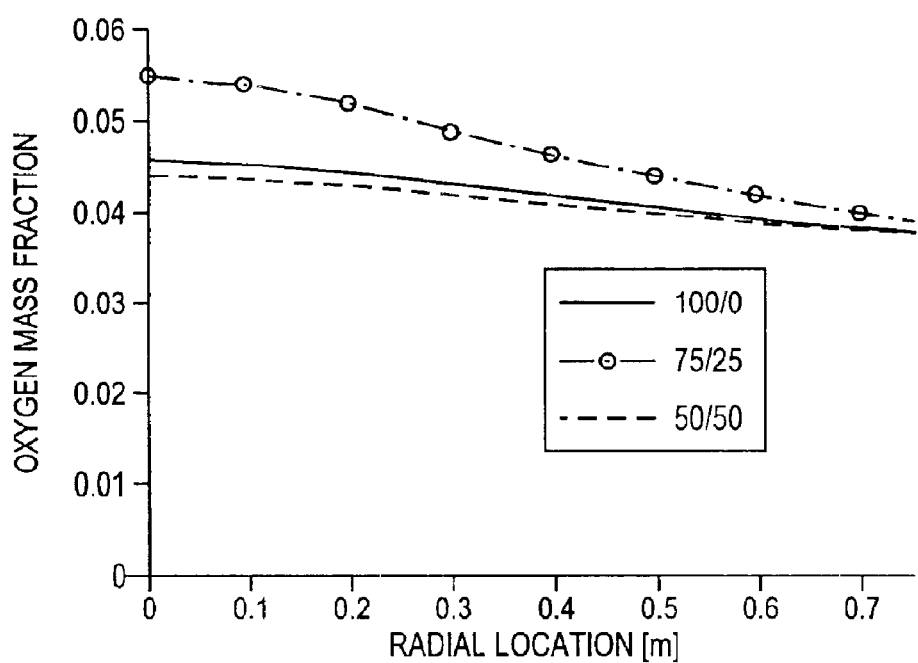
FIG. 8 is a plot of oxygen mass fraction as a function of radial location, at a penetration distance of 3.0 meters from the lance tip of a preferred lancing system of the invention.

FIG. 8 shows the radial oxygen distribution at a penetration distance of 3.0 meters from the lance exit. The results clearly show the advantages of the 72/25 case. The oxygen concentration at a radial location of 0.0 meters is 20% higher for the 75/25 case when compared to the 100/0 case, and 25% higher when compared to the 50/50 case. Furthermore, the 75/25 case presents a consistently higher oxygen concentration for a wide region into the radial direction. Thus, the 75/25 case is apparently preferable to both the 100/0 case and 50/50 case at a penetration distance of 3.0 meters from the lance exit.

Figure 9:
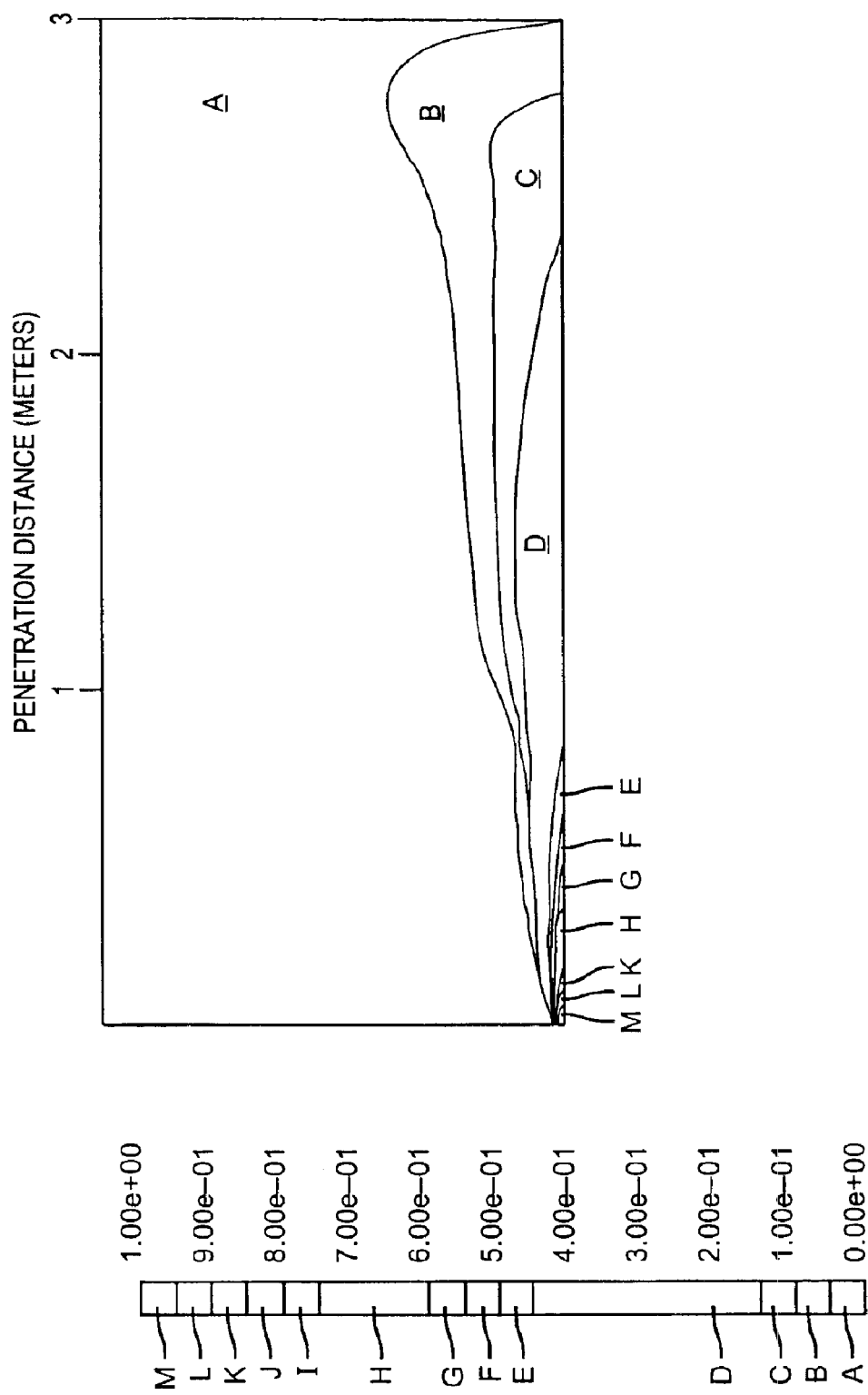
FIG. 9 is a plot of oxygen mass fraction distribution for the 100/0 case (comparative example) simulation.
Figure 10:
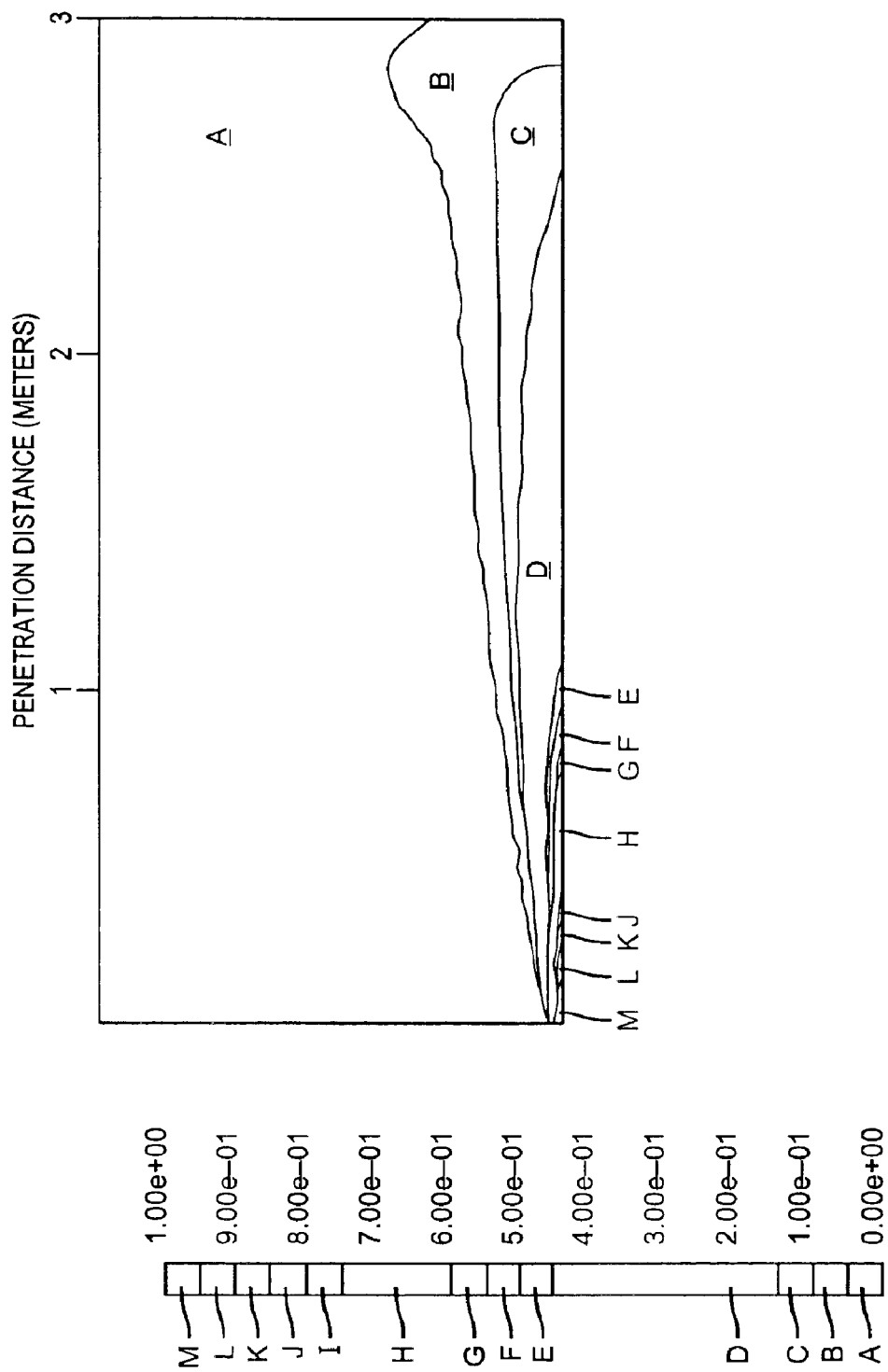
FIG. 10 is a plot of oxygen mass fraction distribution for the 75/25 case simulation of a preferred lancing system of the invention.

FIG. 9 shows the two-dimensional oxygen mass fraction distribution for the 100/0 case, which has a "neck" at a penetration distance of 1 meter. FIG. 10 shows the two-dimensional oxygen mass fraction distribution for the 75/25 case. The 75/25 case does not have the neck observed in the 100/0 case. In addition, the 75/25 case provides a longer jet than the 100/0 case. The longer jet is obtained by using a lower inlet velocity, which also allows for a lower inlet pressure. This aspect is presented below in Table 1.

Figure 11:
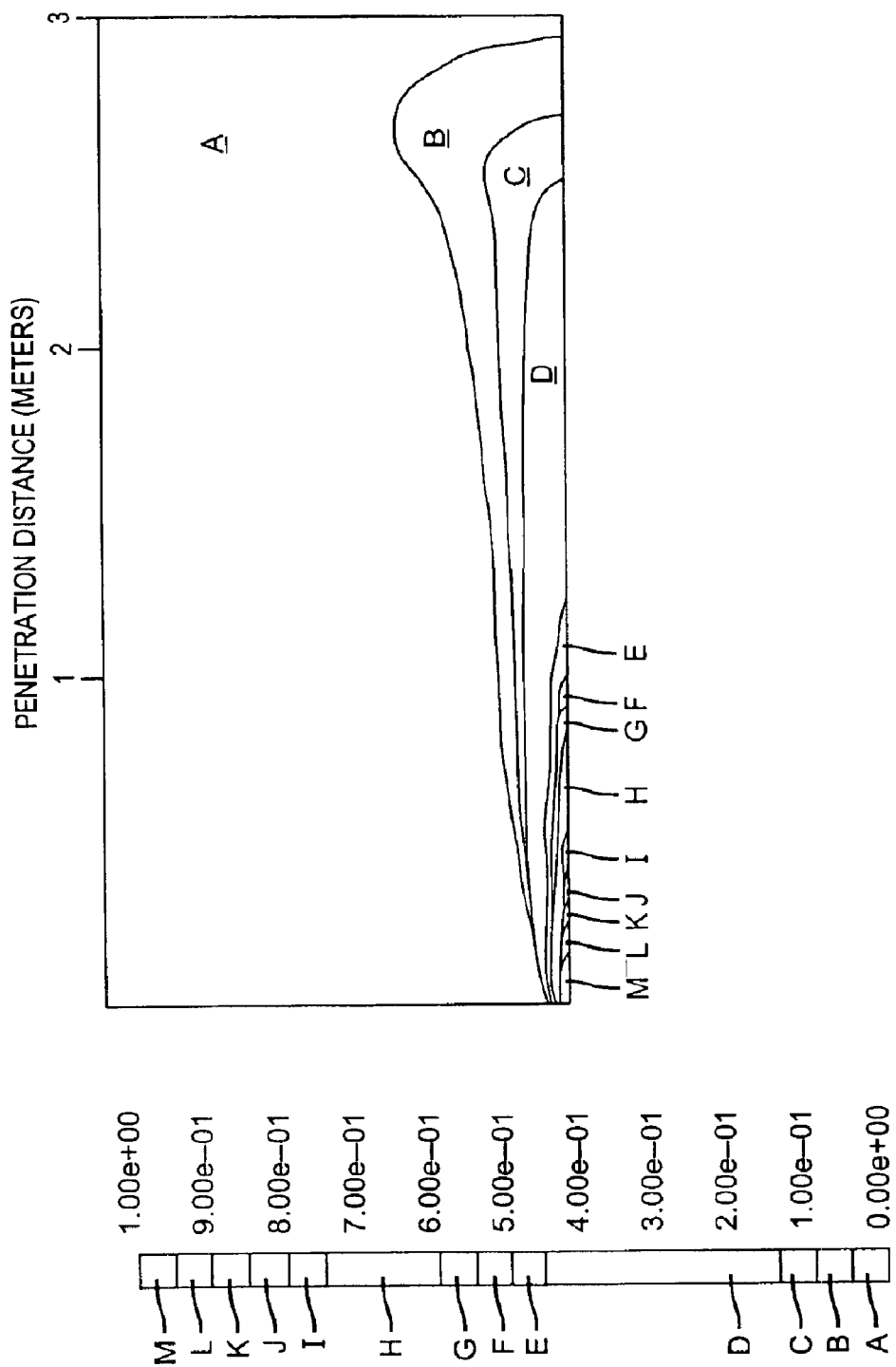
FIG. 11 is a plot of oxygen mass fraction distribution for the 50/50 case simulation of a preferred lancing system of the invention.

FIG. 11 shows the two-dimensional oxygen mass fraction distribution for the 50/50 case. The 50/50 case grows more continuously than the 100/0 case, resulting in a higher oxygen concentration in the jet. The higher oxygen concentration reduces entrainment into the jet and allows for a greater impact on the medium. The 50/50 case does not have the neck observed in the 100/0 case, but the jet length is lower than the two other cases. This result can be attributed to the very low inlet velocity in the inner conduit, leading to a somewhat diminished jet penetration. Thus, while the lower inlet velocity in the 75/25 case created a longer jet, the inlet velocity in the 50/50 case is too low to maintain a longer jet. The longer jet achieved by the 75/25 case is preferable to the shorter jets achieved by the 100/0 case and the 50/50 case.

Table 1 shows the average pressure of gas lanced into the combustion environment. The results show that the 100/0 case requires the highest supply pressure due to the high inlet velocity. The 75/25 case requires a pressure that is about 50% lower than the 100/0 case. The 50/50 case requires a pressure that is about 60% lower than the 100/0 case. Thus, the lower supply pressures permitted in the 75/25 and 50/50 cases, which use concentric conduit configurations similar to the present invention, should result in significant cost savings. Moreover, the combination of the low supply pressure and longer jet provided by the 75/25 case is preferable to the results from the 100/0 case and the 50/50 case. Accordingly, a concentric conduit lance with greater mass flow through the inner pipe than the outer pipe is an apparently preferable embodiment.

TABLE 1

Average inlet oxygen pressure (Pa) for the three cases.

| CASE | PRESSURE (Pa) |
| --- | --- |
| 100/0 | 2850 |
| 75/25 | 1450 |
| 50/50 | 1190 |

The results above show that the concentric conduit lance of the present invention constitutes a clear advantage over the traditional lancing design of a single conduit. This improvement is evident by the increased penetration distance of the lanced gas, increased width of the lanced gas, and the lower required pressure of the lanced gas. Optimizations can be performed with respect to many variables, including jet penetration distance, width, inlet pressure, choice of lanced gas, temperature, and concentration levels. Important savings in terms of the lanced gas are expected, particularly in combustion applications.

It is intended that the foregoing detailed description be regarded as illustrative rather than limiting and that it be understood that it is the following claims, including all equivalents, which are intended to define the scope of this invention.

We claim:

1. A method of lancing gas into an environment, comprising the steps of:

providing an inner conduit;

injecting a first gas at a first mass flow rate through the inner conduit;

providing an outer conduit having a cylindrical body with a first inner diameter and a distal end with a second diameter, wherein the first inner diameter is substantially equal to the second diameter; and injecting a second gas at a second mass flow rate through a second gas flow path defined by an outer surface of the inner conduit and an inner surface of the outer conduit, the inner and outer conduits being concentric, and the first mass flow rate being greater than the second mass flow rate.

2. The method of claim 1 wherein the first mass flow rate is at least two times greater than the second mass flow rate.

3. The method of claim 1 wherein the first mass flow rate is at least three times greater than the second mass flow rate.

4. The method of claim 1 wherein the first mass flow rate is at least 10 tons per day and the second mass flow rate is at least 5 tons per day.

5. The method of claim 1 wherein the first mass flow rate is at least 50 tons per day and the second mass flow rate is at least 25 tons per day.

6. The method of claim 1 wherein the first mass flow rate is at least 100 tons per day and the second mass flow rate is at least 50 tons per day.

7. The method of claim 1 wherein the first mass flow rate is at least 150 tons per day and the second mass flow rate is at least 75 tons per day.

8. The method of claim 1 wherein the distal end of the inner conduit is recessed a distance from the distal end of the outer conduit.

9. The method of claim 8 wherein the inner diameter of the distal end of the inner conduit ranges from about 1 to about 16 cm, and the inner diameter of the distal end of the outer conduit ranges from about 2 to about 31 cm.

10. The method of claim 8 wherein the inner diameter of the distal end of the inner conduit ranges from about 2 to about 10 cm, and the inner diameter of the distal end of the outer conduit ranges from about 5 to about 21 cm.

11. The method of claim 8 wherein the recess distance ranges from about 0.5 to about 6 times the inner diameter of distal end of the outer conduit.

12. The method of claim 8 wherein the recess distance ranges from about 1 to about 4 times the inner diameter of distal end of the outer conduit.

13. The method of claim 8 wherein the recess distance ranges from about 1 to about 186 cm.

14. The method of claim 8 wherein the recess distance ranges from 5 to about 84 cm.

15. The method of claim 1 wherein the first gas is injected at a pressure ranging from about 500 Pa to about 700,000 Pa and the second gas is injected at a pressure ranging from about 70 Pa to about 150,000 Pa.

16. The method of claim 1 wherein the first gas is injected at a pressure ranging from about 650 Pa to about 450,000 Pa and the second gas is injected at a pressure ranging from about 150 Pa to about 75,000 Pa.

17. The method of claim 1 wherein the first gas is oxygen and the second gas is oxygen.

18. The method of claim 1 wherein the first gas is oxygen and the second gas is air.

19. The method of claim 1 wherein the first gas is oxygen and the second gas is nitrogen.

20. The method of claim 1 wherein the first gas is oxygen and the second gas is carbon dioxide.

21. The method of claim 1 wherein the first gas is oxygen and the second gas is flue gas.

22. The method of claim 1 wherein the first gas is oxygen and the second gas is argon.

23. The method of claim 1 wherein the first gas is oxygen and the second gas is steam.

24. The method of claim 1, further comprising the following step:
selecting values for the first and second mass flow rates, wherein the second mass flow rate is greater than 0 and a ratio of the first mass flow rate to the second mass flow rate is equal to or greater than 1.

25. The method of claim 1, further comprising the following steps:
providing a chamber containing a environment comprising at least a third gas and into which the first gas is lanced;
selecting a mass fraction of the first gas with respect to a combined mass of the first, second and third gases at a position in the chamber;
selecting values for the first and second mass flow rates such that the selected mass fraction is achieved at the position.

26. The method of claim 25, wherein the mass fraction is measureable by a system modeling said method of lancing gas into an environment.

27. The method of claim 1, further comprising the following steps:
providing a chamber containing a environment comprising at least a third gas and into which the first gas is lanced; and
selecting a mass fraction of the first gas with respect to a combined mass of the first, second and third gases at a position in the chamber;
selecting a pressure at which the first gas is injected and selecting a pressure at which the second gas is injected such that the selected mass fraction is achieved at the position.

28. The method of claim 27, wherein the mass fraction is measureable by a system modeling said method of lancing gas into an environment.

29. The method of claim 1, further comprising the following steps:
providing a chamber containing a environment comprising at least a third gas and into which the first gas is lanced;
selecting a mass fraction of the first gas with respect to a combined mass of the first, second and third gases at a position in the chamber;
selecting a velocity at which the first gas is injected and selecting a velocity at which the second gas is injected such that the selected mass fraction is achieved at the position.

30. The method of claim 29, wherein the mass fraction is measureable by a system modeling said method of lancing gas into an environment.

31. The method of claim 1, further comprising the following steps:
providing a chamber containing a environment comprising at least a third gas and into which the first gas is lanced;
selecting a mass fraction of the first gas with respect to a combined mass of the first, second and third gases at a position in the chamber;
selecting diameters of the inner and outer conduits such that the selected mass fraction is achieved at the position.

32. The method of claim 29, wherein the mass fraction is measureable by a system modeling said method of lancing gas into an environment.

* * * * *